(12) United States Patent
Teratani et al.

(10) Patent No.: US 9,897,625 B2
(45) Date of Patent: Feb. 20, 2018

(54) DISPLAY CONTROL APPARATUS FOR METER

(71) Applicant: TOYOTA JIDOSHA KABUSHIKI KAISHA, Toyota-shi, Aichi-ken (JP)

(72) Inventors: Yoshiyuki Teratani, Nagoya (JP); Masayasu Mizobuchi, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 45 days.

(21) Appl. No.: 14/846,475

(22) Filed: Sep. 4, 2015

(65) Prior Publication Data
US 2016/0084866 A1  Mar. 24, 2016

(30) Foreign Application Priority Data

Sep. 22, 2014  (JP) ................. 2014-192583

(51) Int. Cl.
*B60K 35/00* (2006.01)
*G01P 1/07* (2006.01)

(52) U.S. Cl.
CPC ................ *G01P 1/07* (2013.01); *B60K 35/00* (2013.01)

(58) Field of Classification Search
CPC ............................. B60K 35/00; B60K 37/06; B60K 2350/1064; B60K 2350/352; G01P 1/07; G01D 7/00; G01D 1/00; F02B 77/08; B60W 40/12; B60W 50/14; B60W 2050/146; B60W 2400/00
See application file for complete search history.

(56) References Cited

U.S. PATENT DOCUMENTS

| 4,880,094 A * | 11/1989 | Ohkumo | B60W 10/02 192/103 R |
| 6,625,562 B2 * | 9/2003 | Hayashi | G01P 1/08 702/142 |
| 6,721,634 B1 * | 4/2004 | Hauler | B60K 35/00 340/441 |
| 2005/0280521 A1 * | 12/2005 | Mizumaki | B60K 35/00 340/438 |
| 2008/0007393 A1 * | 1/2008 | Kanzaka | B60K 35/00 340/441 |

(Continued)

FOREIGN PATENT DOCUMENTS

| JP | H06-129528 A | 5/1994 |
| JP | 2009-029401 A | 2/2009 |
| JP | 2009-220678 A | 10/2009 |

*Primary Examiner* — Stephen Holwerda
(74) *Attorney, Agent, or Firm* — Oliff PLC

(57) ABSTRACT

A display control apparatus for a meter is provided. The display control apparatus includes a rotation sensor and an electronic control unit. The electronic control unit is configured to: (i) during a shift of the automatic transmission, calculate an estimated engine rotation speed estimated on the basis of a gear position after the shift; (ii) during the shift of the automatic transmission, control the meter such that the meter displays the estimated engine rotation speed; and (iii) when the engine has changed from a driving state to a driven state during the shift or the engine has changed from the driven state to the driving state during the shift, control the meter such that the rotation speed of the engine, displayed on the meter, is changed from the estimated engine rotation speed to the rotation speed of the engine, detected by the rotation sensor.

4 Claims, 12 Drawing Sheets

(56) References Cited

U.S. PATENT DOCUMENTS

| | | | |
|---|---|---|---|
| 2008/0042821 A1* | 2/2008 | Kaya | B60K 35/00 340/459 |
| 2008/0258892 A1* | 10/2008 | Itoh | B60K 37/02 340/441 |
| 2009/0273459 A1* | 11/2009 | Crave | F16H 63/42 340/441 |
| 2013/0002418 A1* | 1/2013 | Nakamura | B60K 35/00 340/441 |
| 2013/0096895 A1* | 4/2013 | Willard | B60K 37/02 703/8 |
| 2014/0257675 A1* | 9/2014 | Wasser | F02D 28/00 701/110 |
| 2015/0175004 A1* | 6/2015 | Yasunaga | B60K 35/00 340/441 |
| 2016/0138468 A1* | 5/2016 | Shibata | F02B 77/08 701/110 |

* cited by examiner

DISPLAY CONTROL APPARATUS FOR METER

INCORPORATION BY REFERENCE

The disclosure of Japanese Patent Application No. 2014-192583 filed on Sep. 22, 2014 including the specification, drawings and abstract is incorporated herein by reference in its entirety.

BACKGROUND OF THE INVENTION

1. Field of the Invention

The invention relates to a display control apparatus for a meter and, more particularly, to a display control apparatus for a meter that is provided in a vehicle including an automatic transmission and that displays an engine rotation speed.

2. Description of Related Art

Generally, an automobile, or the like, includes a meter that displays an engine rotation speed (so-called tachometer). Japanese Patent Application Publication No. 2009-220678 (JP 2009-220678 A) describes a technique for estimating an engine rotation speed and then causing a tachometer to display the estimated engine rotation speed in order to improve the responsiveness of the tachometer during a shift.

In JP 2009-220678 A, when a shift occurs, an engine rotation speed displayed on the meter is estimated on the basis of a turbine rotation speed that is predicted in the case where an automatic transmission is set to a gear position after the shift.

SUMMARY OF THE INVENTION

However, if such an estimation process is constantly applied, a display on the meter may not match with a feeling of a driver. For example, when an accelerator is released immediately at the time of a downshift caused by depressing the accelerator, an actual engine rotation speed increases and then temporarily decreases. At this time, when an engine rotation speed is estimated and displayed on a meter as in the case where the accelerator is continuously depressed, display control is continued such that the displayed engine rotation speed is brought close to the engine rotation speed estimated on the basis of a gear position after the shift. As a result, while the actual engine rotation speed is decreasing, the displayed engine rotation speed may continue increasing. In this case, the difference between the actual engine rotation speed and the engine rotation speed displayed on the meter increases, and the directions of changes in these actual engine rotation speed and displayed engine rotation speed are opposite.

When the accelerator is depressed immediately at the time of a power-off upshift caused by releasing the accelerator as well, the direction from a currently displayed rotation speed toward an engine rotation speed that is estimated on the basis of a gear position after the shift is a decreasing direction. However, because an actual engine rotation speed increases as a result of depressing the accelerator, there is an instance at which the direction of a change in the actual engine rotation speed and the direction of a change in the engine rotation speed displayed on the meter are opposite.

The direction of a change in the actual engine rotation speed and the direction of a change in the engine rotation speed displayed on the meter desirably remain coincident with each other as much as possible because this situation matches with a feeling of a driver.

The invention provides a display control apparatus for a meter, which reduces an unnatural display while maintaining the responsiveness of an engine rotation speed that is displayed on the meter.

A display control apparatus for a meter according to an aspect of the invention is provided. The meter is mounted on a vehicle. The vehicle includes an engine and an automatic transmission. The meter is configured to display a rotation speed of the engine. The display control apparatus includes a rotation sensor and an electronic control unit (ECU). The rotation sensor is configured to detect a rotation speed of the engine. The electronic control unit is configured to: (i) during a shift of the automatic transmission, calculate an estimated engine rotation speed estimated on the basis of a gear position after the shift; (ii) during the shift of the automatic transmission, control the meter such that the meter displays the estimated engine rotation speed; and (iii) when the engine has changed from a driving state where the engine drives the vehicle to a driven state where the engine is driven by the vehicle during the shift of the automatic transmission or the engine has changed from the driven state to the driving state during the shift of the automatic transmission, control the meter such that the rotation speed of the engine, displayed on the meter, is changed from the estimated engine rotation speed to the rotation speed of the engine, detected by the rotation sensor.

In the display control apparatus according to the above aspect, the electronic control unit may be configured to, during the shift of the automatic transmission, set the estimated engine rotation speed to a target value of the rotation speed of the engine, displayed on the meter. The electronic control unit may be configured to, during the shift of the automatic transmission, control the meter such that the rotation speed displayed on the meter is brought close to the target value. The electronic control unit may be configured to, when the shift is a downshift and the engine has changed from the driving state to the driven state or when the shift is an upshift and the engine has changed from the driven state to the driving state, change the target value from the estimated engine rotation speed to the rotation speed of the engine, detected by the rotation sensor.

With the display control apparatus according to the above aspect, for example, even when the direction of a change in the engine rotation speed changes depending on a change of accelerator operation after the start of a shift, the target value of the rotation speed displayed on the meter is changed from the estimated engine rotation speed estimated from the gear position after the shift to the engine rotation speed detected by the rotation sensor. Therefore, an unnatural change in the rotation speed displayed on the meter is reduced, so it is possible to make the change match with a feeling of a driver.

In the display control apparatus according to the above aspect, the electronic control unit may be configured to determine whether a shift start condition of the automatic transmission is satisfied on the basis of an accelerator operation amount and a vehicle speed and output a gear position after the shift. The electronic control unit may be configured to calculate a rotation speed of an input shaft of the automatic transmission after the shift on the basis of the vehicle speed and the gear position after the shift. The electronic control unit may be configured to calculate the estimated engine rotation speed by using the rotation speed after the shift.

With the display control apparatus according to the above aspect, the responsiveness of the meter rotation speed is improved, and, even when the accelerator operation changes during a shift, it is possible to cause the meter to display the engine rotation speed that naturally changes.

In the display control apparatus according to the above aspect, the electronic control unit may be configured to decrease a rate at which the displayed rotation speed is brought close to the target value as a difference between the target value and the displayed rotation speed increases.

With the display control apparatus according to the above aspect, a steep change in displayed rotation speed is suppressed, and, when the displayed rotation speed does not change so much, it is possible to stabilize the displayed rotation speed by removing noise.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
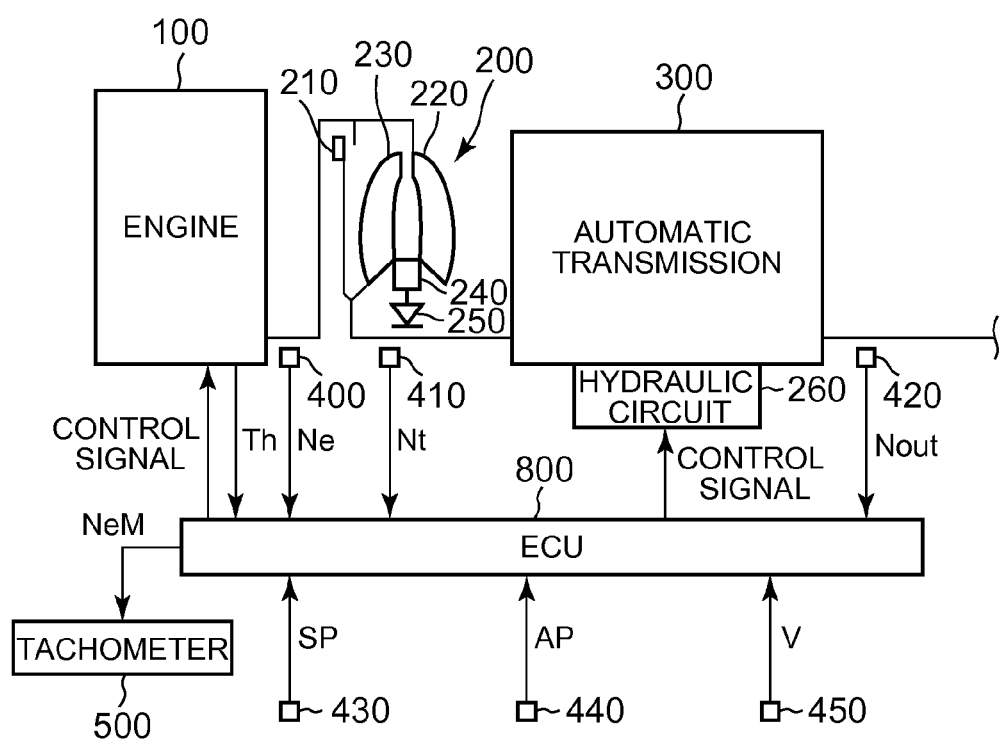
FIG. 1 is a view that shows the configuration of a powertrain of a vehicle on which a control apparatus for a vehicle according to an embodiment is mounted.

Hereinafter, embodiments of the invention will be described with reference to the accompanying drawings. In the following description, like reference numerals denote the same components. The names and functions of them are also the same. Therefore, the detailed description thereof will not be repeated.

FIG. 1 is a view that shows the configuration of a powertrain of a vehicle on which a control apparatus for a vehicle according to a first embodiment of the invention is mounted.

As shown in FIG. 1, the powertrain of the vehicle includes an engine 100 that is a driving force source, a torque converter 200, a stepped automatic transmission 300, an electronic control unit (ECU) 800, and a tachometer 500.

The output shaft of the engine 100 is connected to the input shaft of the torque converter 200. The torque converter 200 includes a lockup clutch 210, an input shaft-side pump impeller 220, an output shaft-side turbine runner 230, and a stator 240. The lockup clutch 210 directly couples the input shaft to the output shaft. The stator 240 includes a one-way clutch 250, and exhibits a torque amplification function. The output shaft of the torque converter 200 is connected to the input shaft of the automatic transmission 300.

The torque converter 200 transmits a torque, corresponding to a slip amount, from the engine 100 side to the automatic transmission 300 side. The slip amount is the difference between the rotation speed of the input shaft-side pump impeller 220 (that is, the rotation speed of the engine 100) and the rotation speed of the output shaft-side turbine runner 230 (that is, the input shaft rotation speed of the automatic transmission 300).

The automatic transmission 300 includes a plurality of planetary gear units, a plurality of hydraulic friction engagement elements, and a hydraulic circuit 260. The hydraulic circuit 260 is used to adjust hydraulic pressures that are supplied to the plurality of friction engagement elements. The hydraulic circuit 260 is formed of an oil pump, various solenoids and oil passages (all of which are not shown). The various solenoids are controlled on the basis of control signals from the ECU 800. The ECU 800 controls engagement force of each of the plurality of friction engagement elements by controlling the various solenoids of the hydraulic circuit 260, thus controlling a speed ratio of the automatic transmission 300.

An engine rotation speed sensor 400, a turbine rotation speed sensor 410, an output shaft rotation speed sensor 420, a position switch 430, an accelerator operation amount sensor 440, a vehicle speed sensor 450, and the like, are connected via a wire harness, or the like, to the ECU 800 that controls the powertrain.

The engine rotation speed sensor 400 detects the rotation speed (engine rotation speed) Ne of the engine 100. The turbine rotation speed sensor 410 detects the rotation speed (turbine rotation speed) Nt of the turbine runner 230 of the torque converter 200. The output shaft rotation speed sensor 420 detects the rotation speed (output shaft rotation speed) Nout of the output shaft of the automatic transmission 300. The position switch 430 detects the position (shift position) SP of a shift lever that is operated by a driver. The accelerator operation amount sensor 440 detects an actual operation amount (actual accelerator operation amount) AP of an accelerator pedal by the driver. The vehicle speed sensor 450 detects a vehicle speed on the basis of the rotation speed of each wheel. Although not shown in the drawing, a throttle opening degree sensor provided in the engine 100 detects a throttle opening degree th. These sensors transmit signals indicating detected results to the ECU 800.

The ECU 800 calculates a meter rotation speed NeM on the basis of the signals from the above-described sensors, and causes the tachometer 500 to display the calculated meter rotation speed NeM.

Figure 2:
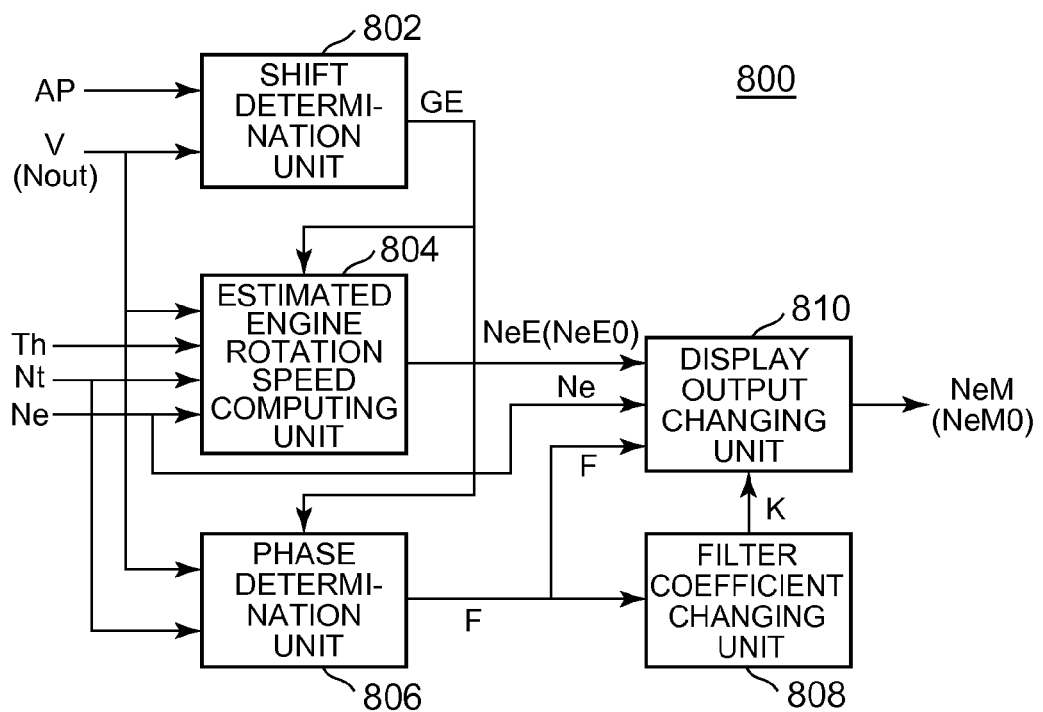
FIG. 2 is a block diagram that shows the configuration of an ECU associated with a meter display.

FIG. 2 is a block diagram that shows the configuration of the ECU 800 associated with a meter display. As shown in FIG. 2, the ECU 800 includes a shift determination unit 802, an estimated engine rotation speed computing unit 804, a phase determination unit 806, a filter coefficient changing unit 808, and a display output changing unit 810.

The shift determination unit 802 makes a shift determination of the automatic transmission 300 on the basis of the accelerator operation amount AP and the vehicle speed V by consulting a predetermined shift line map, and outputs a gear position GE after a shift. When the vehicle is set in a manual shift mode, the shift determination unit 802 outputs a gear position GE after a shift on the basis of a driver's shift operation.

The estimated engine rotation speed computing unit 804 calculates an estimated engine rotation speed NeE on the basis of the vehicle speed V, the throttle opening degree th, the turbine rotation speed Nt, the engine rotation speed Ne and the gear position GE after the shift. Specifically, where a current gear position is G and a gear position after a downshift is G−1, the estimated engine rotation speed computing unit 804 calculates a turbine rotation speed Nt(G−1) after the shift on the basis of the vehicle speed V and the gear position GE after the shift (=G−1), and calculates an estimated engine rotation speed NeE by adding a correction amount ΔN to the turbine rotation speed Nt(G−1) after the shift. The correction amount ΔN will be described later with reference to FIG. 3 and FIG. 4.

The phase determination unit 806 outputs a phase signal F on the basis of the vehicle speed V, the gear position GE and the turbine rotation speed Nt. The phase signal F indicates the degree of progress of a shift. An initial stage from when a shift determination is made to when the turbine rotation speed Nt begins to change is termed preparing phase (F=0), a stage in which the turbine rotation speed Nt is changing because of a shift is termed change phase (F=1), and a stage from when the change in the turbine rotation speed Nt due to the shift substantially completes to completion of the shift is termed end phase (F=2). The phase signal F indicates that the degree of progress of a current shift is any one of the phases (which will also be described later with reference to FIG. 3 and FIG. 4).

The filter coefficient changing unit 808 determines a filter coefficient K on the basis of the phase signal F. The filter coefficient K is used at the time when the display output changing unit 810 executes filtering.

The display output changing unit 810 executes filtering such that the meter rotation speed NeM changes slowly even in the case where a target value to be displayed has steeply changed. The display output changing unit 810 selects one of the engine rotation speed Ne and the estimated engine rotation speed NeE for the target value of the meter rotation speed NeM on the basis of the progress of a shift, that is, the phase signal F, and outputs the meter rotation speed NeM such that the meter rotation speed NeM follows the selected target value at a rate corresponding to the filter coefficient K. Such a process is called filtering, and can be called smoothing.

More specifically, the display output changing unit 810 determines the amount of change per one process cycle such that the current meter rotation speed NeM reaches the target value after a time corresponding to the filter coefficient K, and calculates a next-cycle meter rotation speed NeM.

In the ECU 800 having such a configuration, if the meter rotation speed NeM is calculated at any time on the basis of the estimated engine rotation speed NeE during a shift, the meter rotation speed NeM may not match with a feeling of a driver. For example, when the accelerator is released immediately at the time of a downshift caused by depressing the accelerator, an actual engine rotation speed Ne increases and then temporarily decreases. At this time, if the engine rotation speed NeM is estimated and displayed on the meter as in the case where the accelerator is continuously depressed, the displayed engine rotation speed NeM may continue increasing while the actual engine rotation speed Ne is decreasing. In this case, the difference between the actual engine rotation speed Ne and the engine rotation speed NeM displayed on the meter increases, and the directions of changes in these actual engine rotation speed Ne and displayed engine rotation speed NeM are opposite.

When the accelerator is depressed immediately at the time of a power-off upshift caused by releasing the accelerator as well, there is also an instance at which the directions of changes in rotation are opposite.

Figure 3:
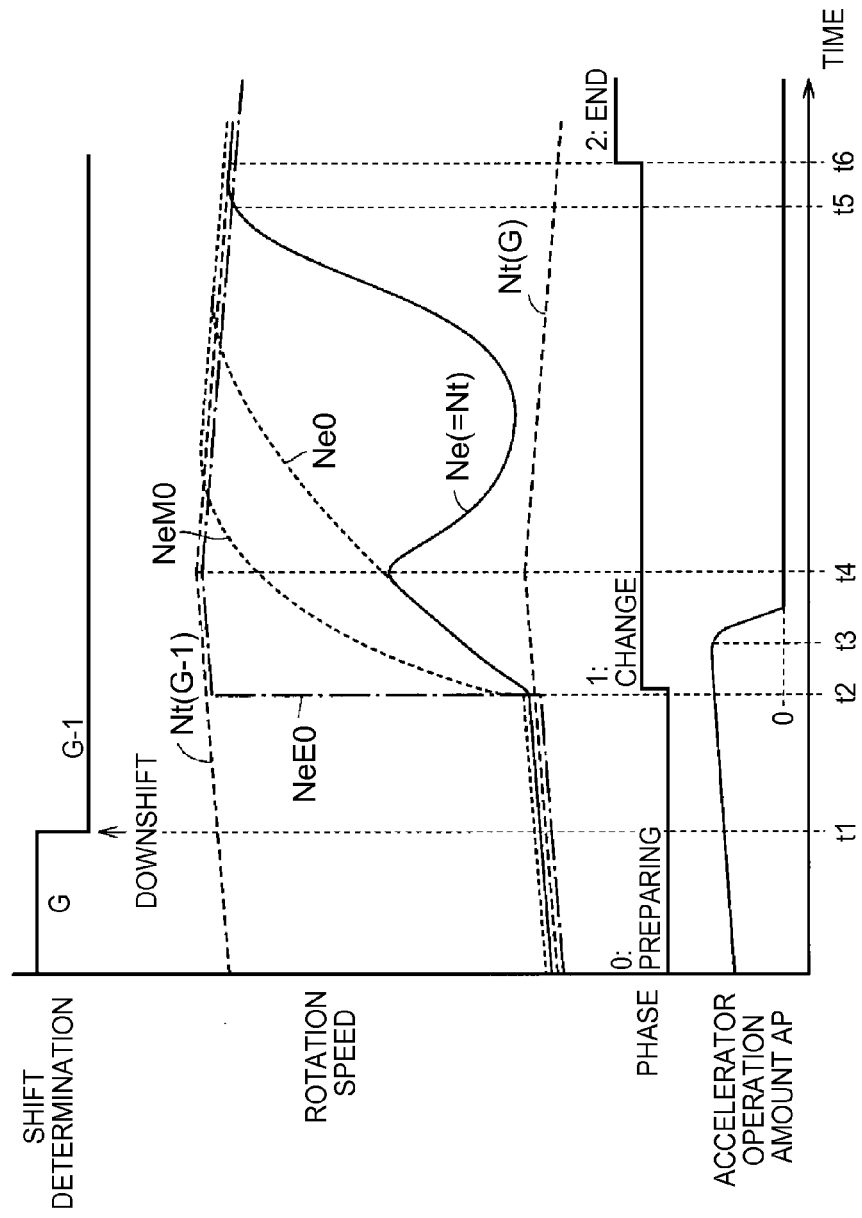
FIG. 3 is an operation waveform chart for illustrating an example of a phenomenon that a displayed engine rotation speed increases although an actual engine rotation speed decreases.

FIG. 3 is an operation waveform chart for illustrating an example of a phenomenon that the displayed engine rotation speed increases although the actual engine rotation speed decreases.

As shown in FIG. 2 and FIG. 3, in response to the fact that the accelerator is depressed before time t1, the gear position GE that indicates the result of a shift determination changes from G (for example, third speed) to G−1 (for example, second speed) at time t1.

A rotation speed Nt(G) indicates a turbine rotation speed that is calculated by the vehicle speed V and the speed ratio of the automatic transmission at the gear position G A rotation speed Nt(G−1) indicates a turbine rotation speed that is calculated by using the vehicle speed V and the speed ratio of the automatic transmission at the gear position G−1. In FIG. 3, with the progress of the shift, the turbine rotation speed Nt changes from Nt(G) toward Nt(G−1).

The phase that indicates the degree of progress of a shift corresponds to the phase signal F in FIG. 2, and changes in order of the preparing phase, the change phase and the end phase. In FIG. 3, the phase is the preparing phase (F=0) until time t2, the change phase (F=1) from time t2 to time t6, or the end phase (F=2) after time t6.

When the engine rotation speed suddenly changes as in the case during a shift, a delay of a display on the tachometer 500 tends to occur. This delay in response is due to a time that is taken by the process of computing the engine rotation speed on the basis of an input signal from the engine rotation speed sensor or a response time of the tachometer 500 to the computed engine rotation speed.

In order to eliminate the delay, it is conceivable to display an engine rotation speed on the tachometer 500 by predicting a change in the engine rotation speed. During a shift from the gear position G to the gear position G−1, when the gear position G−1 after the shift is acquired, it is possible to predict that the turbine rotation speed Nt changes from Nt(G) to Nt(G−1). When the torque converter 200 is in a lockup state, Nt(G−1) is set as a target value NeMt after the shift, and then undergoes filtering by the filter coefficient K that indicates an appropriate rate of change. Thus, it is possible to change the meter rotation speed NeM in advance of a change in the detected engine rotation speed Ne.

When the torque converter 200 is not in the lockup state, the process of adding a correction amount to the turbine rotation speed Nt(G−1) and then displaying the corrected rotation speed is executed. In this case, Ne−Nt that is the difference between the input and output rotation speeds of the torque converter is used as the correction amount.

In this case, an estimated engine rotation speed NeE0 is Nt(G−1)+ΔN. Where ΔN is the correction amount, and ΔN=(Ne−Nt).

On the other hand, when the torque converter 200 is in the lockup state, the correction amount is zero, so NeE0=Nt(G−1). For the sake of easy illustration, FIG. 3 shows a waveform (Ne=Nt) in the case where the lockup clutch is engaged.

That is, in FIG. 3, in response to the fact that a downshift determination is made at time t1, the estimated engine rotation speed NeE0 changes from Nt(G) to Nt(G−1) at time t2. Following this change, the meter rotation speed NeM0 also smoothly increases because of filtering.

When the accelerator is not released in such a state, the actual engine rotation speed also changes as indicated by the engine rotation speed Ne0. In this case, the meter rotation speed NeM0 is output such that a delay time in computing the rotation speed and the amount of delay in the response time of the tachometer at the time when the rotation speed sensor outputs a signal to the tachometer via the ECU reduce, so a meter display matches with a feeling of a driver.

However, as shown in FIG. 3, when the accelerator operation amount AP has decreased from time t3 because of the fact that the user releases the accelerator, the actual engine rotation speed Ne continues increasing up to time t4 and then decreases. As a result, around time t4, the meter rotation speed NeM and the engine rotation speed Ne change in opposite directions. Such changes do not match with a feeling of a driver. In the case shown in FIG. 3, the timing of changing the target value NeE0 is limited to the timing at which the phase has changed from the preparing phase to the change phase. That is, when the target value NeE0 is once changed to Nt(G−1), such a phenomenon tends to occur because a follow-up change is prohibited while the phase of the shift is the change phase.

In the present embodiment, in order to reflect a change in engine rotation speed due to releasing the accelerator in the middle of a shift, when the accelerator is released even during the change phase, the target value to be displayed on the meter is changed from the engine rotation speed that is estimated from the gear position after the shift to the engine rotation speed detected by the engine rotation speed sensor.

Figure 4:
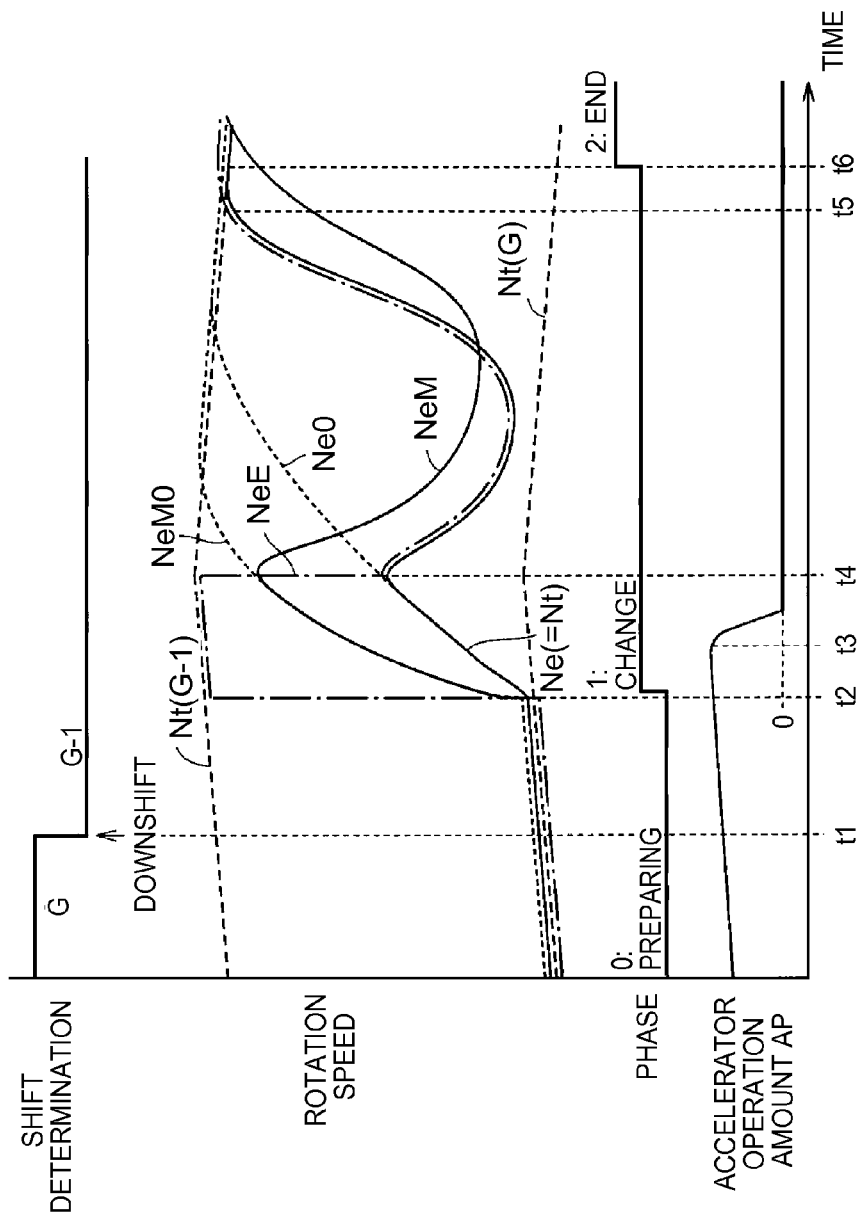
FIG. 4 is an operation waveform chart for illustrating a meter display improved in the embodiment.

FIG. 4 is an operation waveform chart for illustrating a meter display improved in the present embodiment. The waveform in FIG. 4 indicates the target value NeE instead of the estimated engine rotation speed NeE0; however, a shift determination and a phase are the same as those in the case described with reference to FIG. 3, so the description will not be repeated. As shown in FIG. 2 and FIG. 4, in response to releasing the accelerator at time t3, the target value NeE of the meter rotation speed NeM is changed at time t4 from the engine rotation speed Ne(G−1) corresponding to the gear position after the shift to the engine rotation speed Ne detected by the engine rotation speed sensor.

As a result of the change of the target value NeE at time t4, the meter rotation speed NeM that follows the target value NeE also begins to decrease from time t4.

Therefore, the direction of a change in the meter rotation speed NeM, different from NeM0 shown in FIG. 3, does not become opposite from that of the engine rotation speed Ne around time t4.

Next, the process that is executed by the ECU 800 in order to achieve a meter display shown in FIG. 4 will be described.

Figure 5:
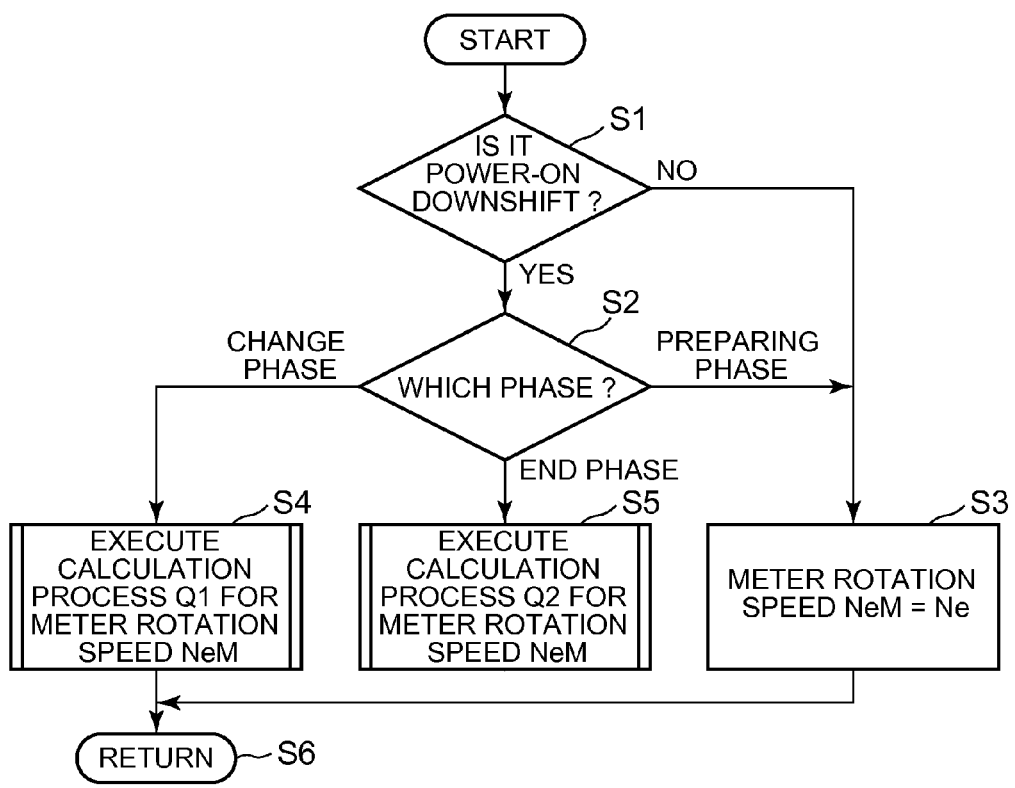
FIG. 5 is a main routine of a meter display process that is executed by the ECU.

FIG. 5 is a main routine of a meter display process that is executed by the ECU 800. As shown in FIG. 5, the ECU 800 makes a shift determination on the basis of the shift line map in step S1, and determines whether a shift determination output is a downshift caused by depressing the accelerator (power-on downshift).

Figure 6:
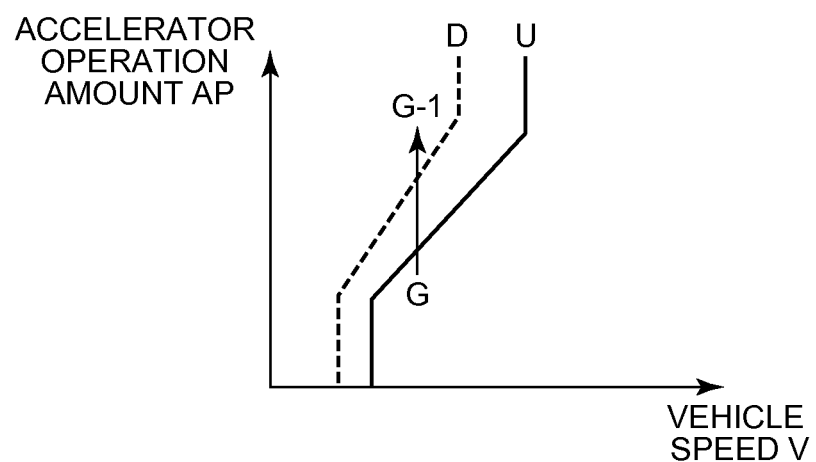
FIG. 6 is a view that shows an example of a shift line map for illustrating a shift determination output.

FIG. 6 is a view that shows an example of the shift line map for illustrating a shift determination output. In the case of a power-on downshift, as shown in FIG. 6, as the accelerator operation amount AP increases, the operation point of the vehicle crosses a downshift line D from a high vehicle speed side toward a low vehicle speed side, so a shift determination of a downshift from the gear position G to the gear position G−1 is made.

Even a vehicle on which an automatic transmission is mounted may include a manual shift mode in which a downshift or an upshift is carried out in response to user's instruction with the use of a shift lever. When such a vehicle is set to the manual shift mode, a shift determination of an upshift or downshift is made in response to user's shift lever operation. In this case, a downshift occurs in response to user's shift lever operation, and, when the accelerator operation amount at this time is larger than or equal to a predetermined value, the ECU 800 determines that a power-on downshift has occurred.

Referring back to FIG. 5, when the ECU 800 determines in step S1 that no power-on downshift has occurred (NO in step S1), the ECU 800 advances the process to step S3. In step S3, the ECU 800 sets the meter rotation speed NeM to the current engine rotation speed Ne, and transmits the meter rotation speed NeM to the tachometer 500.

On the other hand, when the ECU 800 determines in step S1 that a power-on downshift has occurred (YES in step S1), the ECU 800 advances the process to step S2. In step S2, the phase that indicates the degree of progress of the shift is determined. The phase determination process will be described in detail later with reference to FIG. 7.

When it is determined in step S2 that the current phase is the change phase, the process proceeds to step S4, and a calculation process Q1 for calculating the meter rotation speed NeM is executed. The calculation process Q1 will be described later in detail with reference to FIG. 8.

When it is determined in step S2 that the current phase is the end phase, the process proceeds to step S5, and a calculation process Q2 for calculating the meter rotation speed NeM is executed. The calculation process Q2 will be described later in detail with reference to FIG. 11.

When it is determined in step S2 that the current phase is the preparing phase, the process proceeds to step S3, the ECU 800 sets the meter rotation speed NeM to the current engine rotation speed Ne, and transmits the meter rotation speed NeM to the tachometer 500.

When the meter rotation speed NeM is calculated in any one of step S3 to step S5, control is returned to the main routine in step S6.

Figure 7:
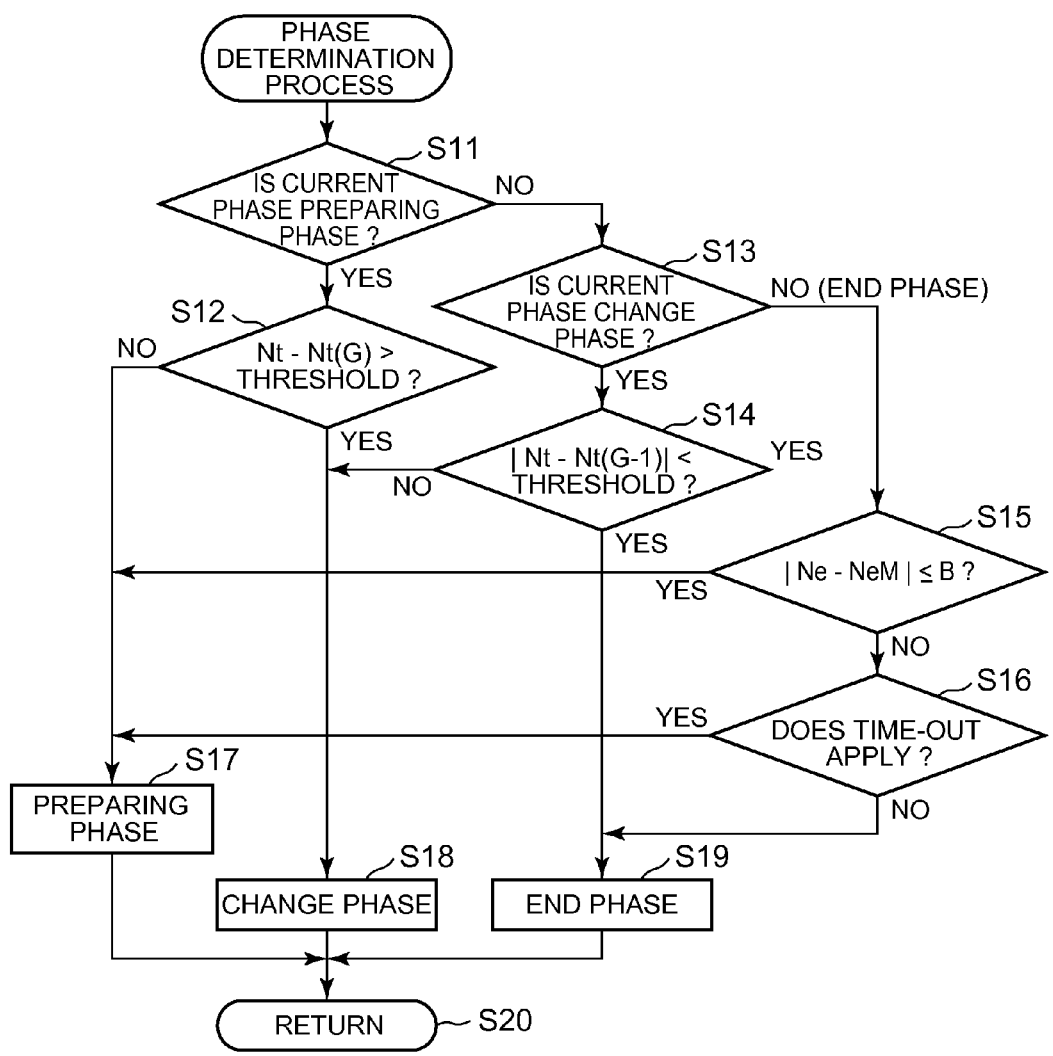
FIG. 7 is a flowchart for illustrating a phase determination process that is executed in step S2 of FIG. 5.

FIG. 7 is a flowchart for illustrating the phase determination process that is executed in step S2 of FIG. 5. As shown in FIG. 7, the ECU 800 initially determines in step S11 whether the current phase is the preparing phase. The ECU 800 stores the current phase as a variable F. In the case of F=0, the current phase is the preparing phase. In the case of F=1, the current phase is the change phase. In the case of F=2, the current phase is the end phase.

When the current phase is the preparing phase in step S11 (YES in step S11), the process proceeds to step S12. In step S12, the ECU 800 determines whether the current turbine rotation speed Nt has changed from the turbine rotation speed Nt(G) corresponding to the gear position G before the shift. Specifically, the ECU 800 determines whether Nt−Nt(G) is larger than a threshold.

When Nt−Nt(G) is not larger than the threshold in step S12 (NO in step S12), the process proceeds to step S17, and it is continuously determined that the current phase is the preparing phase. When Nt−Nt(G) is larger than the threshold in step S12 (YES in step S12), the process proceeds to step S18, and it is determined that the phase changes from the preparing phase to the change phase. For example, around time t2 in FIG. 4, Nt (=Ne) changes from Nt(G) and begins to increase toward Nt(G−1), and, as a result of the fact that affirmative determination is made in step S12, the phase has changed from the preparing phase to the change phase.

When it is determined in step S11 that the current phase is not the preparing phase (NO in step S11), the process proceeds to step S13. In step S13, it is determined whether the current phase is the change phase.

When it is determined in step S13 that the current phase is the change phase (YES in step S13), the process proceeds to step S14. In step S14, it is determined whether the condition of changing from the change phase to the end phase is satisfied. This condition is satisfied when the state where the turbine rotation speed Nt is sufficiently close to the turbine rotation speed Nt(G−1) corresponding to the gear position G−1 after the shift has continued, and is specifically satisfied when |Nt−Nt(G−1)| is smaller than a threshold.

When the condition of changing from the change phase to the end phase is not satisfied in step S14 (NO in step S14), the process proceeds to step S18, and the phase remains at the change phase. On the other hand, when the condition of changing from the change phase to the end phase is satisfied in step S14 (YES in step S14), the process proceeds to step S19, and it is determined that the phase changes from the change phase to the end phase.

For example, around time t6 in FIG. 4, the turbine rotation speed Nt is close to the target turbine rotation speed Nt(G−1), so affirmative determination is made in step S14, with the result that the phase changes from the change phase to the end phase.

When negative determination is made in step S13, the current phase is the end phase. In this case, it is determined in step S15 whether the difference between the meter rotation speed NeM and the engine rotation speed Ne is smaller than or equal to a threshold B. When |Ne−NeM| is smaller than or equal to B in step S15 (YES in step S15), the phase changes from the end phase to the preparing phase.

On the other hand, when |Ne−NeM| is not smaller than or equal to B in step S15 (NO in step S15), the process proceeds to step S16, and it is determined whether time-out applies. Time-out applies when the end phase continues for a predetermined time.

When time-out applies in step S16 (YES in step S16), the process proceeds to step S17, and the phase changes from the end phase to the preparing phase. On the other hand, when time-out does not apply in step S16 (NO in step S16), the phase remains at the end phase.

When the phase is determined in any one of step S17 to step S19, the process proceeds to step S20, and control is returned to the flowchart of FIG. 5.

A determination of the phase is described above. Next, the calculation process for the meter rotation speed NeM, which is executed in the change phase or the end phase, will be described sequentially.

Figure 8:
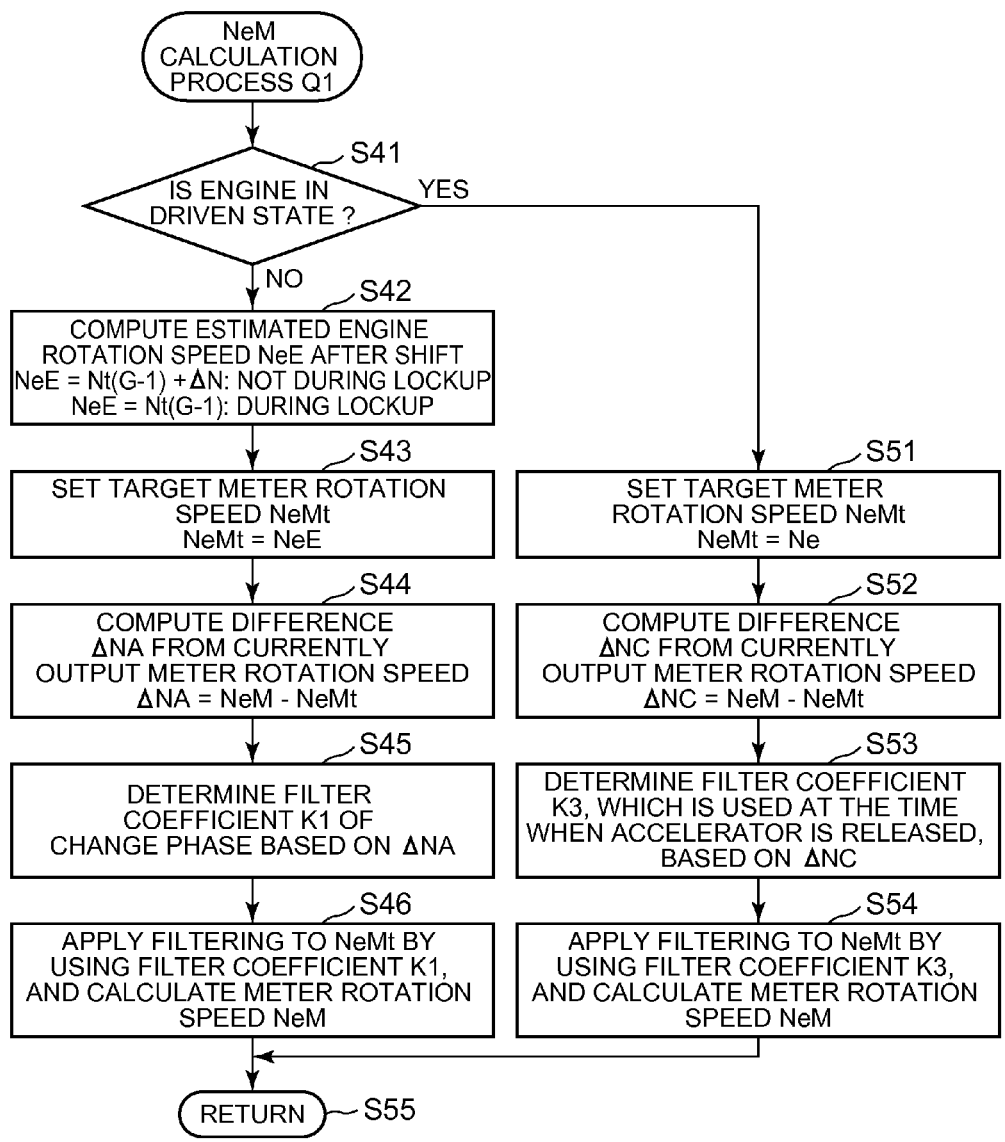
FIG. 8 is a flowchart for illustrating a calculation process for a meter rotation speed, which is executed in a change phase of a shift process.

FIG. 8 is a flowchart for illustrating the calculation process Q1 for the meter rotation speed NeM, which is executed in the change phase of the shift process. The process of this flowchart is executed when it is determined in step S2 that the phase is the change phase and the process proceeds to step S4 in the process of the flowchart shown in FIG. 5.

As shown in FIG. 8, when the calculation process Q1 is started, the ECU 800 initially determines in step S41 whether the engine is in a driven state during a power-on downshift started in a state where the engine is in a driving state.

The driven state indicates a state where the engine 100 is driven by the inertia force of the vehicle from the torque converter 200 side. For example, the case where engine brake is activated while the accelerator is released corresponds to the driven state.

Figure 9:
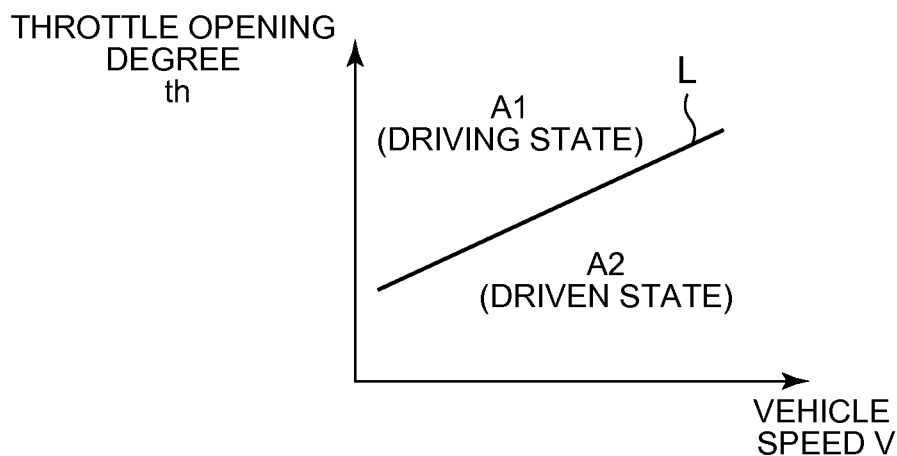
FIG. 9 is a view that shows an example of a map that is used at the time of determining whether the engine is in a driven state.

FIG. 9 is a view that shows an example of a map that is used at the time of determining whether the engine is in the driven state. In FIG. 9, the ordinate axis represents throttle opening degree th, and the abscissa axis represents vehicle speed V. A coordinate plane is divided into a region A1 and a region A2 with the line L set as a boundary. The region A1 indicates an engine driving state. The region A2 indicates the engine driven state. When the throttle opening degree is larger than the line L, larger engine torque is generated, so the vehicle is driven by the engine via the torque converter (engine driving state). On the other hand, when the throttle opening degree is smaller than the line L, engine torque becomes insufficient, so the engine is driven by the inertia force of the vehicle via the torque converter (engine driven state). The line L connects points at which the driving force of the engine and the running resistance of the vehicle are balanced. As the vehicle speed increases, the throttle opening degree increases. The ECU 800 determines whether the vehicle is currently in the engine driving state or the engine driven state on the basis of the vehicle speed V and the throttle opening degree th by consulting the map shown in FIG. 9.

When it is determined in step S41 that the engine is not in the driven state (NO in S41), the process proceeds to step S42. In step S42, the estimated engine rotation speed NeE after the shift is computed.

When the torque converter 200 is not in a lockup state, the estimated engine rotation speed NeE after the shift is computed by adding the correction amount to the turbine rotation speed Nt(G−1). In this case, the estimated engine rotation speed NeE0 is Nt(G−1)+ΔN. Where ΔN is the correction amount, and ΔN=(Ne−Nt).

On the other hand, when the torque converter 200 is in the lockup state, the correction amount is zero, so NeE0=Nt(G−1).

Subsequently, in step S43, the target value NeMt of the meter rotation speed is set. The target value NeMt is a value before filtering, and the meter rotation speed MeM may be calculated by applying filtering to the target value NeMt. The ECU 800, in step S43, sets the target value NeMt to the estimated engine rotation speed NeE calculated in step S42, and, in step S44, calculates a difference ΔNA between the currently output meter rotation speed and the target value by the following mathematical expression.

$$\Delta NA = MeM - NeMt$$

The ECU 800 determines a filter coefficient K1 in the change phase in step S45 on the basis of the difference ΔNA.

Figure 10:
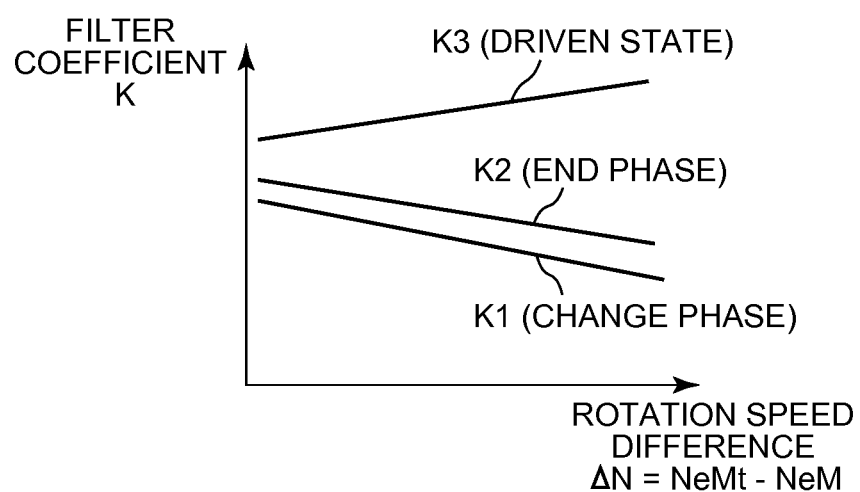
FIG. 10 is a view that shows an example of a map that is used at the time of determining a filter coefficient.

FIG. 10 is a view that shows an example of a map that is used at the time of determining the filter coefficient. In FIG. 10, the ordinate axis represents a filter coefficient K, and the abscissa axis represents a rotation speed difference. In the change phase, the filter coefficient K1 is determined as shown in FIG. 10.

The ECU 800 determines the amount of change per one process cycle such that the current meter rotation speed NeM reaches a target value (value before filtering) after a time corresponding to the filter coefficient K, and calculates a next-cycle meter rotation speed NeM. Therefore, as the filter coefficient K increases, a rate at which the meter rotation speed NeM follows the target value delays, so the change is slowly reflected in the output.

In FIG. 10, as the rotation speed difference ΔN between the current meter rotation speed NeM and the estimated engine rotation speed NeE that is the target value increases, the filter coefficient K1 decreases. That is, as the difference between the current value and the target value increases, a change in the output becomes faster through filtering; whereas, as the difference between the current value and the target value reduces, a change in the output becomes slower through filtering. Therefore, when the value changes by a larger amount, trackability is increased; whereas, when the value does not change so much, such a change that the value fluctuates little by little is suppressed. A filter coefficient K3 will be described later together with step S53, and a filter coefficient K2 will be described later together with the flowchart of FIG. 11.

Referring back to FIG. 8, after the filter coefficient K1 is determined in step S45, the ECU 800 uses the filter coefficient K1 for filtering in step S46. The ECU 800 slows the change by applying filtering to the target value NeMt, and calculates the meter rotation speed NeM.

On the other hand, when it is determined in step S41 that the engine is in the driven state, the process proceeds to step S51.

In step S51, the ECU 800 sets the target value NeMt of the meter rotation speed. The target value NeMt is a value before filtering. When filtering is applied to the target value NeMt, the meter rotation speed MeM is calculated. The ECU 800, in step S51, sets the target value NeMt to the engine rotation speed Ne detected by the rotation speed sensor, and, in step S52, calculates a difference $\Delta NC$ between the currently output meter rotation speed and the target value by the following mathematical expression.

$$\Delta NC = MeM - NeMt$$

The ECU 800 determines the filter coefficient K3 that is applied when the accelerator is released (in the driven state) in the change phase in step S45 on the basis of the difference $\Delta NC$. The filter coefficient K3 is determined by the map shown in FIG. 10. In FIG. 10, the filter coefficient K3 in the driven state is set so as to be larger than the filter coefficient K1 that is used in the change phase in the driving state.

After the filter coefficient K3 is determined in step S53, the ECU 800 uses the filter coefficient K3 for filtering in step S54. The ECU 800 slows the change by applying filtering to the target value NeMt, and calculates the meter rotation speed NeM.

When the meter rotation speed NeM is calculated through filtering in step S46 or step S54, the process proceeds to step S55, and control is returned to the flowchart of FIG. 5.

Figure 11:
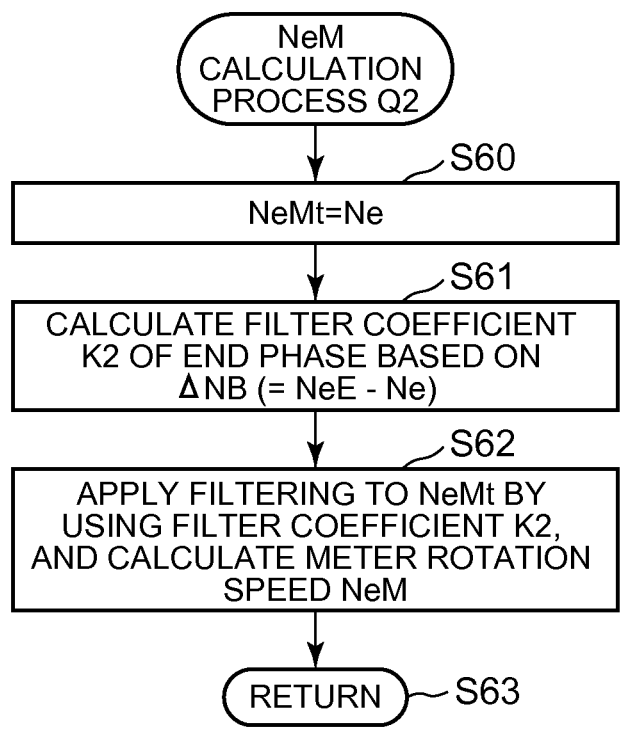
FIG. 11 is a flowchart for illustrating a calculation process for a meter rotation speed, which is executed in an end phase of the shift process.

Next, the calculation process for the meter rotation speed NeM, which is executed in the end phase, will be described. FIG. 11 is a flowchart for illustrating the calculation process Q2 for the meter rotation speed NeM that is executed in the end phase of the shift process. The process of this flowchart is executed when it is determined in step S2 that the phase is the end phase and the process proceeds to step S5 in the process of the flowchart shown in FIG. 5. The calculation process Q2 is the process of slowly changing from the currently displayed meter rotation speed NeM to the actual engine rotation speed Ne by applying filtering.

As shown in FIG. 11, when the calculation process Q2 is started, the target value (value before filtering) NeMt for filtering is initially set to the engine rotation speed Ne detected by the engine rotation speed sensor in step S60.

Subsequently, in step S61, the ECU 800 calculates the filter coefficient K2 for the end phase on the basis of a rotation speed difference $\Delta NB$ (=NeM−Ne). For example, as shown in FIG. 10, the filter coefficient K2 for the end phase is set so as to be larger than the filter coefficient K1 for the change phase. As the filter coefficient K increases, the rate of the change becomes slower. As in the case of K1, as the rotation speed difference increases, the filter coefficient K2 decreases.

When the filter coefficient K2 is determined in step S61, the process proceeds to step S62. In step S62, the ECU 800 executes filtering such that the meter rotation speed NeM is brought close to the engine rotation speed Ne that is the target value of the meter rotation speed at a rate corresponding to the filter coefficient K2, and calculates the meter rotation speed NeM. The tachometer 500 displays the rotation speed on the basis of the meter rotation speed NeM. When the meter rotation speed NeM is calculated in step S62, control is returned to the flowchart of FIG. 5 in step S63.

In the first embodiment, measures for an unnatural change of a meter display in the case where the accelerator is released at the time of a downshift caused by depressing the accelerator are described. As the measures, in the first embodiment, in order to reflect a change in engine rotation speed, caused by releasing the accelerator in the middle of a downshift, a target value to be displayed on the meter is changed from the rotation speed (higher than the current Ne) that is estimated from the gear position after the shift to the engine rotation speed detected by the engine rotation speed sensor when the accelerator is released.

In a second embodiment, measures for an unnatural change of a meter display in the case where the accelerator is depressed at the time of an upshift caused by releasing the accelerator will be described. In such a case, inversely with the case of FIG. 4, the engine rotation speed Ne may once increase in course of decreasing from Nt(G−1) to Nt(G).

In the second embodiment, as the measures, in order to reflect a change in engine rotation speed, caused by depressing the accelerator in the middle of an upshift, a target value to be displayed on the meter is changed from the rotation speed (lower than the current Ne) that is estimated from the gear position after the shift to the engine rotation speed detected by the engine rotation speed sensor when the accelerator is depressed.

Figure 12:
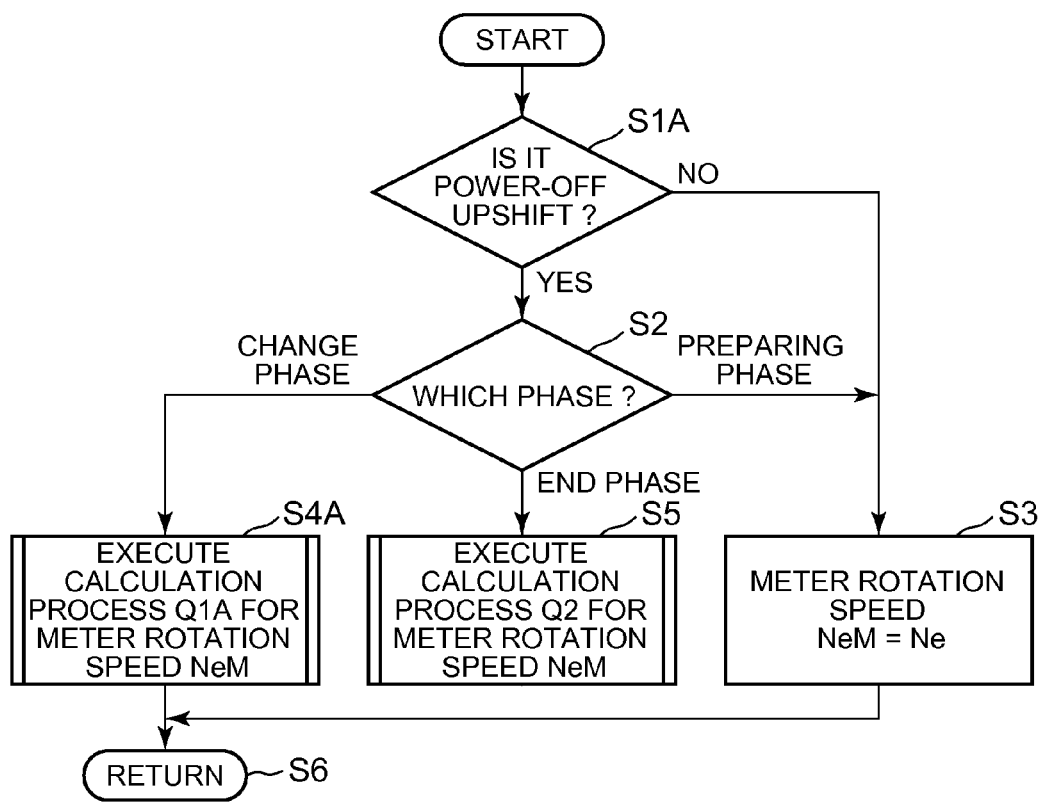
FIG. 12 is a main routine of a meter display process that is executed by the ECU according to a second embodiment.
Figure 13:
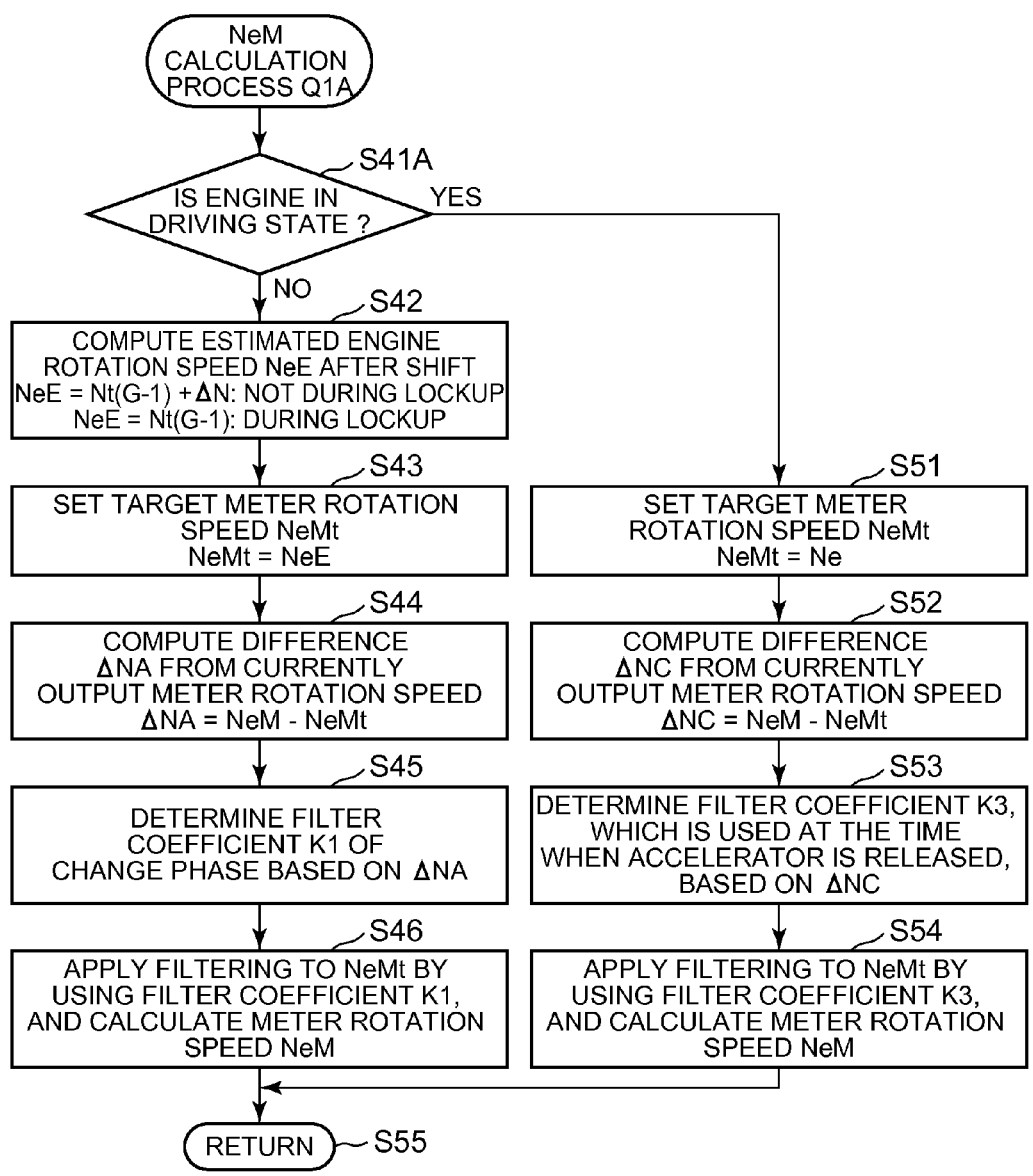
FIG. 13 is a flowchart for illustrating a calculation process for a meter rotation speed, which is executed in a change phase of the shift process according to the second embodiment.

In the second embodiment as well, almost all the components, and the like, of FIG. 1 and FIG. 2 are common to those in the first embodiment, and the second embodiment differs from the first embodiment in that the processes of FIG. 12 and FIG. 13 are executed instead of the processes of the flowcharts of FIG. 5 and FIG. 8. Therefore, the description of the common portions will not be repeated.

FIG. 12 is a main routine of a meter display process that is executed by the ECU 800 according to the second embodiment. As shown in FIG. 12, the ECU 800 makes a shift determination on the basis of the shift line map in step S1A, and determines whether a shift determination output is an upshift caused by releasing the accelerator (power-off upshift).

When the ECU 800 determines in step S1A that no power-off upshift has occurred (NO in step S1A), the ECU 800 advances the process to step S3. In step S3, the ECU 800 sets the meter rotation speed NeM to the current engine rotation speed Ne, and transmits the meter rotation speed NeM to the tachometer 500.

On the other hand, when the ECU 800 determines in step S1A that a power-off upshift has occurred (YES in step S1A), the ECU 800 advances the process to step S2. In step S2, the phase that indicates the degree of progress of the shift is determined. The phase determination process is described in detail with reference to FIG. 7 in the first embodiment, so the description thereof will not be repeated.

When it is determined in step S2 that the current phase is the change phase, the process proceeds to step S4A, and a calculation process Q1A for calculating the meter rotation speed NeM is executed. The calculation process Q1A will be described later in detail with reference to FIG. 13.

When it is determined in step S2 that the current phase is the end phase, the process proceeds to step S5, and the calculation process Q2 for calculating the meter rotation speed NeM is executed. The calculation process Q2 is described with reference to FIG. 11 in the first embodiment, so the description thereof will not be repeated.

When it is determined in step S2 that the current phase is the preparing phase, the process proceeds to step S3, the ECU 800 sets the meter rotation speed NeM to the current engine rotation speed Ne, and transmits the meter rotation speed NeM to the tachometer 500.

When the meter rotation speed NeM is calculated in any one of step S3, step S4A and step S5, control is returned to the main routine in step S6.

FIG. 13 is a flowchart for illustrating the calculation process Q1A for the meter rotation speed NeM, which is executed in the change phase of the shift process according to the second embodiment. The process of this flowchart is executed when it is determined in step S2 that the phase is the change phase and the process proceeds to step S4A in the process of the flowchart shown in FIG. 12.

As shown in FIG. 13, when the calculation process Q1A is started, the ECU 800 initially determines in step S41A whether the engine is in the driving state during a power-off upshift started in a state where the engine is in the driven state.

The driving state indicates a state where the engine 100 is driving the vehicle via the torque converter 200 and the automatic transmission 300. For example, the case where the vehicle travels at a constant speed or accelerates at the time when the accelerator is depressed corresponds to the driving state.

When it is determined in step S41A that the engine is not in the driving state (NO in step S41A), the processes of step S42 to step S46 are executed. In this case, the estimated engine rotation speed NeE is used as the target value NeMt, filtering is applied to the estimated engine rotation speed NeE, and the meter rotation speed NeM is calculated.

On the other hand, when it is determined in step S41A that the engine is in the driving state (YES in step S41A), the processes of step S51 to step S54 are executed. In this case, the engine rotation speed Ne detected by the engine rotation speed sensor is used as the target value NeMt, filtering is applied to the engine rotation speed Ne, and the meter rotation speed NeM is calculated.

The processes of the other step S42 to step S46, and step S51 to step S54 are the same as those of FIG. 8 according to the first embodiment, so the description thereof will not be repeated.

In the case of the second embodiment, it is possible to eliminate an unnatural change of a meter display in the case where the accelerator is depressed at the time of an upshift caused by releasing the accelerator.

The second embodiment may be combined with the first embodiment. In such a case, the determination of step S1A in FIG. 12 just needs to be carried out before the process proceeds to step S3 in the case where negative determination is made in step S1 of FIG. 5.

Lastly, referring back to FIG. 1 and FIG. 2, the first and second embodiments are summarized. Each of the first and second embodiments relates to the display control apparatus for the meter that is provided in the vehicle including the automatic transmission 300 and that displays the rotation speed of the engine 100. The display control apparatus for the meter is configured to, during a shift of the automatic transmission 300, display the estimated engine rotation speed NeE estimated on the basis of the gear position after the shift and, when the engine 100 has changed from the driving state where the engine 100 drives the vehicle to the driven state where the engine 100 is driven by the vehicle during the shift or changed from the driven state to the driving state during the shift, change the estimated engine rotation speed NeE to the engine rotation speed Ne detected by the engine rotation speed sensor 400.

Preferably, the display control apparatus includes the ECU 800 that is configured to, during the shift of the automatic transmission, set the estimated engine rotation speed to the target value NeMt to be displayed on the meter and bring the meter rotation speed NeM close to the target value NeMt. The ECU 800 is configured to, when the shift of the automatic transmission 300 is a downshift and the engine 100 has changed from the driving state to the driven state (YES in S41 in FIG. 8) or when the shift of the automatic transmission 300 is an upshift and the engine 100 has changed from the driven state to the driving state (YES in S41A in FIG. 13), change the target value NeMt from the estimated engine rotation speed NeE to the detected engine rotation speed Ne.

Preferably, as shown in FIG. 2, the ECU 800 includes the shift determination unit 802, the estimated engine rotation speed computing unit 804, and the display output changing unit 810. The shift determination unit 802 is configured to determine whether a shift start condition is satisfied on the basis of the accelerator operation amount and the vehicle speed and output the gear position after the shift. The estimated engine rotation speed computing unit 804 is configured to calculate the rotation speed of the input shaft of the automatic transmission after the shift (turbine rotation speed after the shift) on the basis of the vehicle speed and the gear position after the shift and calculate the estimated engine rotation speed NeE by using the rotation speed after the shift. The display output changing unit 810 is configured to change the target value NeMt to one of the estimated engine rotation speed NeE and the detected engine rotation speed Ne on the basis of a change between the engine driving state and the engine driven state and bring the meter rotation speed NeM close to the target value NeMt.

More preferably, as shown by the filter coefficient in FIG. 10, the display output changing unit 810 decreases the rate at which the meter rotation speed NeM is brought close to the target value NeMt as the difference between the target value NeMt and the meter rotation speed NeM increases.

With the above configuration, for example, even when the direction of a change in the engine rotation speed Ne changes depending on a change of the accelerator operation after the start of a shift, the target value NeMt of the meter rotation speed is changed from the estimated engine rotation speed NeE estimated from the gear position after the shift to the engine rotation speed Ne detected by the engine rotation speed sensor. Therefore, an unnatural change in the meter rotation speed NeM is reduced, so it is possible to make the change match with a feeling of a driver.

The embodiments described above are illustrative and not restrictive in all respects. The scope of the invention is defined by the appended claims rather than the above description. The scope of the invention is intended to encompass all modifications within the scope of the appended claims and equivalents thereof.

What is claimed is:

1. A display control apparatus for a meter, the meter being mounted on a vehicle, the vehicle including an engine and an automatic transmission, the meter being configured to display a rotation speed of the engine, the display control apparatus comprising:
 a rotation sensor configured to detect a rotation speed of the engine; and
 an electronic control unit configured to:
  (i) during a shift of the automatic transmission, calculate an estimated engine rotation speed estimated based on a gear position after the shift;
  (ii) during the shift of the automatic transmission, control the meter such that the meter displays the estimated engine rotation speed; and
  (iii) when the electronic control unit determines that the engine has changed from a driving state where the engine drives the vehicle to a driven state where the engine is driven by the vehicle during the shift of the automatic transmission or when the electronic control unit determines that the engine has changed from the driven state to the driving state during the shift of the automatic transmission, control the meter, during the shift of the automatic transmission after the change has been determined, so that the rotation speed of the engine, displayed on the meter, is changed from the estimated engine rotation speed which is displayed during a first portion of the shift of the automatic transmission regardless of whether a lockup clutch of a torque converter connected between the engine and the automatic transmission is in a lockup state or is not in the lockup state, to the rotation speed of the engine detected by the rotation sensor, which is displayed during a portion of the shift of the automatic transmission after the first portion.

2. The display control apparatus according to claim 1, wherein the electronic control unit is configured to
 during the shift of the automatic transmission,
  set the estimated engine rotation speed to a target value of the rotation speed of the engine, displayed on the meter, and
  control the meter such that the rotation speed displayed on the meter is brought close to the target value, and
 when the shift is a downshift and the engine has changed from the driving state to the driven state or when the shift is an upshift and the engine has changed from the driven state to the driving state, during the shift of the automatic transmission after the change has been determined, change the target value from the estimated engine rotation speed to the rotation speed of the engine detected by the rotation sensor.

3. The display control apparatus according to claim 2, wherein the electronic control unit is configured to
 determine whether a shift start condition of the automatic transmission is satisfied based on an accelerator operation amount and a vehicle speed, and output a gear position after the shift,
 calculate a rotation speed of an input shaft of the automatic transmission after the shift based on the vehicle speed and the gear position after the shift, and
 calculate the estimated engine rotation speed by using the rotation speed after the shift.

4. The display control apparatus according to claim 3, wherein
 the electronic control unit is configured to decrease a rate at which the rotation speed displayed on the meter is brought close to the target value as a difference between the target value and the rotation speed displayed on the meter increases.

* * * * *